US008560808B2

(12) United States Patent
Rakshit et al.

(10) Patent No.: US 8,560,808 B2
(45) Date of Patent: *Oct. 15, 2013

(54) DYNAMICALLY UPDATING CURRENT COMMUNICATION INFORMATION

(75) Inventors: Sarbajit Kumar Rakshit, Kolkata (IN); Shawn K. Sremaniak, Raleigh, NC (US); Thomas S. Mazzeo, Durham, NC (US); Barry Allan Kritt, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,580

(22) Filed: Jan. 3, 2012

(65) Prior Publication Data
US 2013/0174235 A1  Jul. 4, 2013

(51) Int. Cl.
G06F 7/04 (2006.01)
G06F 15/16 (2006.01)
G06F 17/30 (2006.01)
G06F 21/00 (2013.01)
H04L 29/06 (2006.01)

(52) U.S. Cl.
USPC .................................. 712/6; 726/3; 713/186

(58) Field of Classification Search
USPC ......................................... 726/3, 6; 713/186
See application file for complete search history.

(56) References Cited

U.S. PATENT DOCUMENTS

| 7,477,780 | B2 | 1/2009 | Boncyk et al. |
| 7,565,139 | B2 | 7/2009 | Neven, Sr. et al. |
| 2006/0256959 | A1* | 11/2006 | Hymes ................... 379/433.04 |
| 2009/0087102 | A1 | 4/2009 | Lee |
| 2009/0215479 | A1* | 8/2009 | Karmarkar .................. 455/466 |
| 2009/0268888 | A1 | 10/2009 | Hsu et al. |
| 2010/0027915 | A1* | 2/2010 | Heins ............................ 382/305 |
| 2010/0325218 | A1* | 12/2010 | Castro et al. ................. 709/206 |
| 2011/0019587 | A1* | 1/2011 | Wang ............................ 370/254 |
| 2011/0026778 | A1 | 2/2011 | Ye |
| 2011/0044444 | A1 | 2/2011 | Abramson |
| 2011/0069823 | A1 | 3/2011 | Chen et al. |
| 2013/0006816 | A1* | 1/2013 | Nuzzi et al. .................. 705/27.1 |

FOREIGN PATENT DOCUMENTS

WO  2010055503  A2  5/2010

* cited by examiner

*Primary Examiner* — Kambiz Zand
*Assistant Examiner* — Aubrey Wyszynski
(74) *Attorney, Agent, or Firm* — Terrile, Cannatti, Chambers & Holland, LLP; Stephen A. Terrile

(57) ABSTRACT

A method, system and computer readable media for dynamically updating current communication information, for enabling access to current communication based upon biometric information and/or for allowing communication information to be associated with biometric information and then allowing this communication information to be provided to desired recipients.

8 Claims, 6 Drawing Sheets

DYNAMICALLY UPDATING CURRENT COMMUNICATION INFORMATION

BACKGROUND OF THE INVENTION

1. Field of the Invention

The present disclosure relates in general to the field of computers and similar technologies, and in particular to software utilized in this field. Still more particularly, it relates to a facial communication system for use in the field of computers.

2. Description of the Related Art

Known mobile communication devices provide a convenient means of communicating, be it via a voice call, short message service (SMS), multimedia messaging service (MMS), Instant Messaging (IM) Chat or other method of communication. Additionally, known mobile communication devices often include integrated still photo and video recording technology. Such mobile communication devices have become popular in the consumer marketplace, and many consumers now rely on their mobile communication devices, such as cellular phones, to take pictures and shoot videos, exchange messages in their social network, and carry out other activities.

However, an issue can be present if a user wishes to communicate with someone who for some reason is not carrying their mobile communication device, has lost their mobile communication device, has changed the number of their mobile communication device or is carrying a different mobile communication device with a different number. For example, if a user forgot their mobile communication device and might borrow another mobile communication device to make a call. It is likely that the recipient of the call would then associate the number of the borrowed mobile communication device with the user making the call rather than the actual owner of the mobile communication device.

Often the communication address Mobile Device Number, Email address, IM Chat ID, etc) has become the personal identity of a person. In many situations, communication is with a particular communication address rather than a particular person. Additionally, a single person can have multiple communication addresses such as a mobile communication device number, an Email address, an IM Chat identifier (ID), etc, and then can change any of these addresses very rapidly. Accordingly, it can be difficult for users to locate a current good contact point of any person.

However, it is difficult to communicate with a person at least one of these communication addresses of that person is not known. It can also be difficult to communicate with an individual who is beyond audible distance (i.e., out of hearing range), where at least one of these communication addresses of that person is not known.

SUMMARY OF THE INVENTION

Accordingly, a method, system and computer readable media are disclosed for dynamically updating current communication information, for enabling access to current communication based upon biometric information and/or for allowing communication information to be associated with biometric information and then allowing this communication information to be provided to desired recipients.

More specifically, according to one aspect of the disclosure, for communicating (e.g., via phone call, SMS, IM Chat, etc.) with a person, a user selects a photograph of person with whom they want to communicate. In another aspect, a user can select one or more faces from a group photo or a single photo and bases on the selection of faces, the current communication address becomes available to the user for communication.

Additionally, according to another aspect of the disclosure, users can change their current communication address dynamically by selecting a current device identification (e.g., a "My Current Device" option) in any communication device. Upon selecting this option the current communication address (be it a phone number, email address, IM Chat ID etc.) is provided to a known accessible location such as a Social Network site. Other users can access the current communication address of the user from the known accessible location. In certain aspects, this current communication address is accessible based on facial recognition. The user can provide security settings to limit access to the current communication address to certain desired other users.

Additionally, according to another aspect of the disclosure, a plurality of different possible methods is provided to allow a user to select a photograph of a person or a group of people. For example, in addition to taking a photograph or a screen shot from a motion video, a user can scan a copy or take a photo of a hard copy of a photograph. A user can also use a camera that is integrated within a mobile communications device to zoom and take a photograph of an individual who is outside of audible range, the user can then use this photo to access the individual's communication address and then to call the individual. Also, for example, a called party can select any person from a group photo and then the device performs a face recognition operation on the group photo to identify individuals within the group photo. Once this identification is performed, identification of a current communication address is performed based upon the identification.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
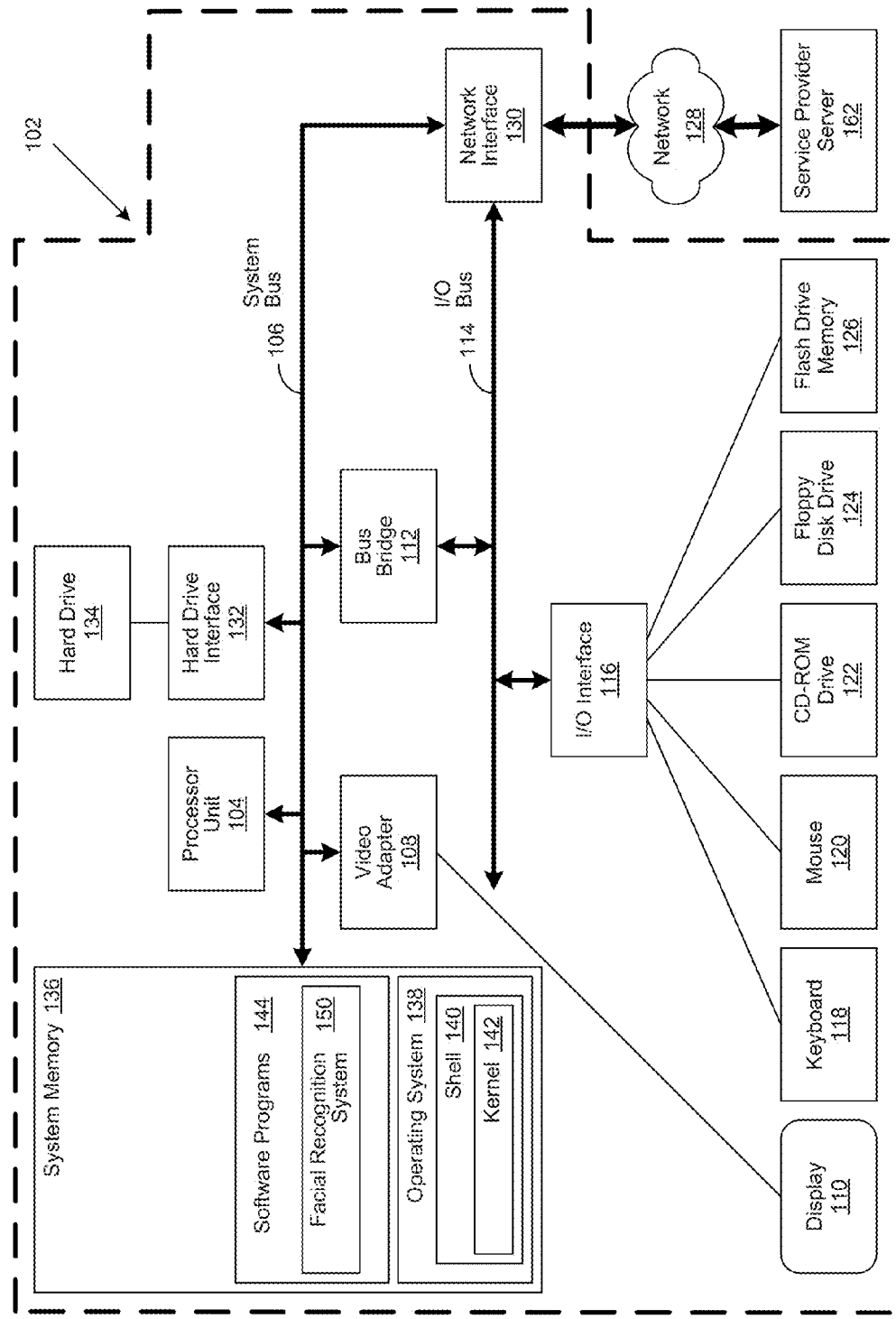
FIG. 1 shows a block diagram of an exemplary computer system.

A method, system and computer-usable medium are disclosed for dynamically updating current communication information, for enabling access to current communication based upon biometric information and/or for allowing communication information to be associated with biometric information and then allowing this communication information to be provided to desired recipients. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device, in the context of this document, a computer-usable or computer-readable medium may be any medium that can contain, store, communicate, or transport the program for use by or in connection the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 162 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 162.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As shown, OS 138 also includes kernel 142, which includes lower levels of functionality for OS 138, including essential services required by other parts of OS 138 and software programs 144, including memory management, process and task management, disk management, and mouse and keyboard management.

Software programs 144 may include facial recognition system 150. The facial recognition system 150 includes code for implementing the processes described below. In one embodiment, client computer 102 is able to download the facial recognition system 150 from a service provider server 162.

The hardware elements shown in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
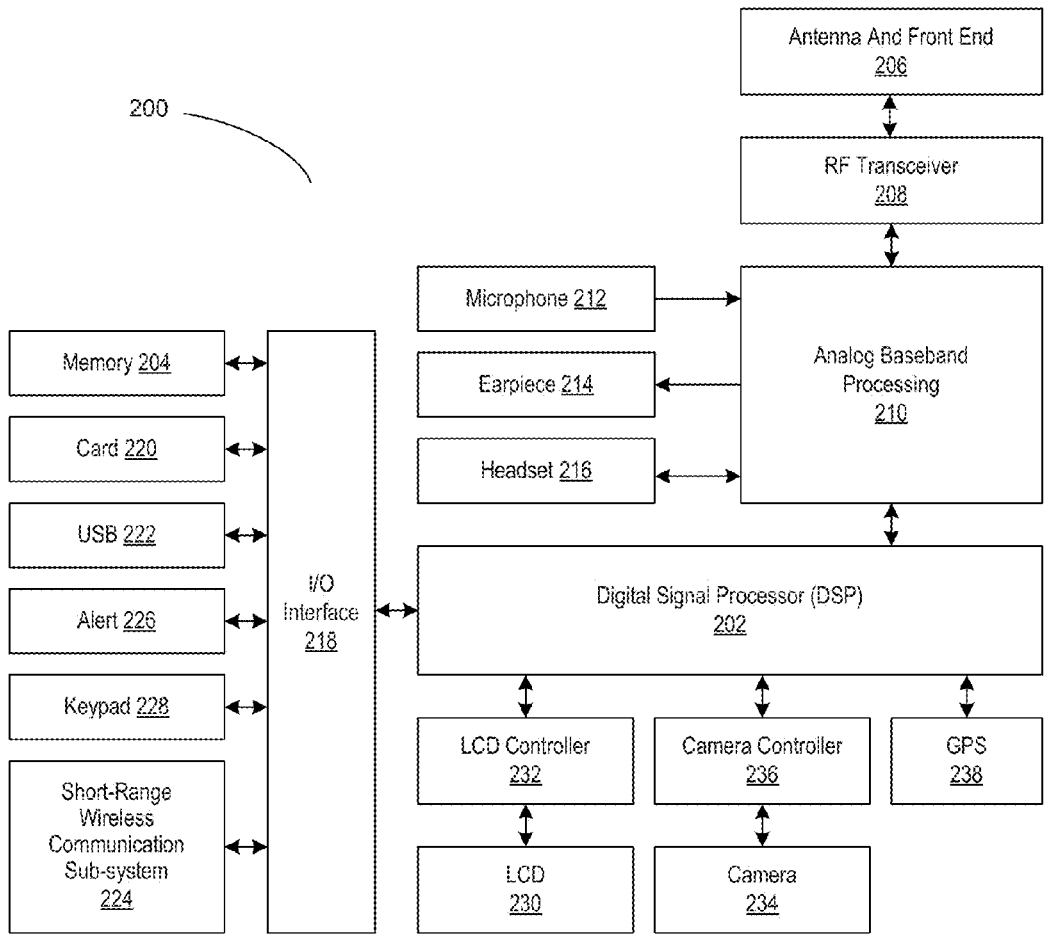
FIG. 2 shows a block diagram of an exemplary mobile communication device.

FIG. 2 shows a block diagram of an exemplary user equipment (UE) X02 in which the present invention may be implemented. While various components of a UE X02 are shown, various embodiments of the UE X02 may include a subset of the listed components or additional components not listed. As shown in FIG. 2, the UE X02 includes a digital signal processor (DSP) 202 and a memory 204. As shown, the UP X02 may further include an antenna and front end unit 206, a radio frequency (RF) transceiver 208, an analog baseband processing unit 210, a microphone 212, an earpiece speaker 214, a headset port 216, an input/output (I/O) interface 218, a removable memory card 220, a universal serial bus (USB) port 222, a short range wireless communication sub-system 224, an alert 226, a keypad 228, a liquid crystal display (LCD) 230, which may include a touch sensitive surface, an LCD controller 232, a charge-coupled device (CCD) camera 234, a camera controller 236, and a global positioning system (GPS) sensor 238. In various embodiments, the UE X02 may include another kind of display that does not provide a touch sensitive screen. In an embodiment, the DSP 202 may communicate directly with the memory 204 without passing through the input/output interface 218.

In various embodiments, the DSP 202 or some other form of controller or central processing unit (CPU) operates to control the various components of the UE X02 in accordance with embedded software or firmware stored in memory 204 or stored in memory contained within the DSP 202 itself. In addition to the embedded software or firmware, the DSP 202 may execute other applications stored in the memory 204 or made available via information carrier media such as portable data storage media like the removable memory card 220 or via wired or wireless network communications. The application software may comprise a compiled set of machine-readable instructions that configure the DSP 202 to provide the desired functionality, or the application software may be high-level software instructions to be processed by an interpreter or compiler to indirectly configure the DSP 202.

The antenna and front end unit 206 may be provided to convert between wireless signals and electrical signals, enabling the UE X02 to send and receive information from a cellular network or some other available wireless communications network or from a peer UE X02. In an embodiment, the antenna and front end unit may include multiple antennas to support beam forming and/or input multiple output (MIMO) operations, As is known to those skilled in the art, MEW operations may provide spatial diversity which can be used to overcome difficult channel conditions or to increase channel throughput. Likewise, the antenna and front end unit 206 may include antenna tuning or impedance matching components, RF power amplifiers, or low noise amplifiers.

In various embodiments, the RF transceiver 208 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 210 or the DSP 202 or other central processing unit. In some embodiments, the RF Transceiver, portions of the Antenna and Front End 206, and the analog base band processing unit 210 may be combined in one or more processing units and/or application specific integrated circuits (ASICs).

The analog baseband processing unit 210 may provide various analog processing of inputs and outputs, for example analog processing of inputs from the microphone 212 and the headset 216 and outputs to the earpiece 214 and the headset 216. To that end, the analog baseband processing unit 210 may have ports for connecting to the built-in microphone 212 and the earpiece speaker 214 that enable the UE X02 to be used as a cell phone. The analog baseband processing unit 210 may further include a port for connecting to a headset or other hands-free microphone and speaker configuration. The analog baseband processing unit 210 may provide digital-to-analog conversion in one signal direction and analog-to-digital conversion in the opposing signal direction. In various embodiments, at least some of the functionality of the analog baseband processing unit 210 may be provided by digital processing components, for example by the DSP 202 or by other central processing units.

The DSP 202 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 202 may perform modulation, coding, interleaving, and spreading, and for a receiver function the DSP 202 may perform despreading, deinterleaving, decoding, and demodulation. In another embodiment, for example in an orthogonal frequency division multiplex access (OFDMA) technology application, for the transmitter function the DSP 202 may perform modulation, coding, interleaving, inverse fast Fourier transforming, and cyclic prefix appending, and for a receiver function the DSP 202 may perform cyclic prefix removal, fast Fourier transforming, deinterleaving, decoding, and demodulation. In other wireless technology applications, yet other signal processing functions and combinations of signal processing functions may be performed by the DSP 202.

The DSP 202 may communicate with a wireless network via the analog baseband processing unit 210, In some embodiments, the communication may provide Internet connectivity, enabling a user to gain access to content on the Internet and to send and receive e-mail or text messages. The input/output interface 218 interconnects the DSP 202, and various memories and interfaces. The memory 204 and the removable memory card 220 may provide software and data to configure the operation of the DSP 202. Among the interfaces may be the USB interface 222 and the short range wireless communication sub-system 224. The USB interface 222 may be used to charge the UE, X02 and may also enable the UE X02 to function as a peripheral device to exchange information with a personal computer or other computer system, The short range wireless communication sub-system 224 may include an infrared port, a Bluetooth interface, an IEEE 802.11 compliant wireless interface, or any other short range wireless communication sub-system, which may enable the UE X02 to communicate wirelessly with other nearby mobile devices and/or wireless base stations.

The input/output interface 218 may further connect the DSP 202, to the alert 226 that, when triggered, causes the UE X02 to provide a notice to the user, for example, by ringing, playing a melody, or vibrating. The alert 226 may serve as a mechanism for alerting the user to any of various events such as an incoming call, a new text message, and an appointment reminder by silently vibrating, or by playing a specific pre-assigned melody for a particular caller.

The keypad 228 couples to the DSP 202 via the I/O interface 218 to provide one mechanism for the user to make selections, enter information, and otherwise provide input to the UE X02. The keyboard 228 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 230, which may include touch screen capability and also display text and/or graphics to the user. The LCD controller 232 couples the DSP 202 to the LCD 230.

The camera 234, if equipped, enables the UE X02 to take digital pictures. The DSP 202 communicates with the camera 234 via the camera controller 236. The GPS sensor 238 is coupled to the DSP 202 to decode global positioning system signals, thereby enabling the UE X02 to determine its position. Various other peripherals may also be included to provide additional functions, such as radio and television reception.

Figure 3:
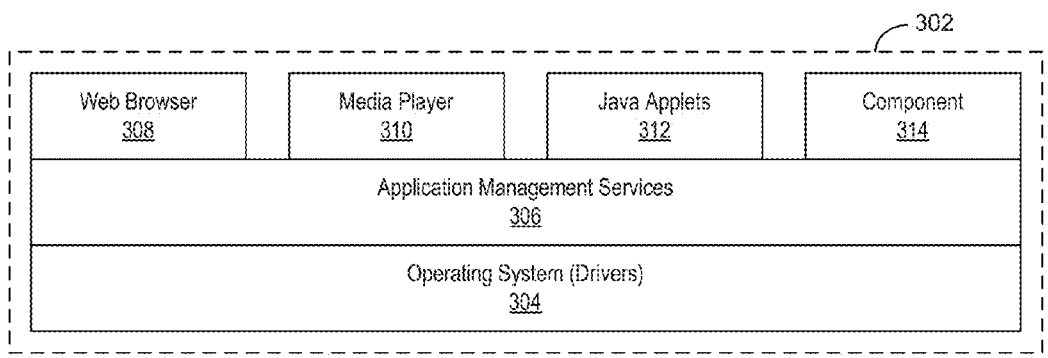
FIG. 3 shows a block diagram of a software environment.

FIG. 3 illustrates a software environment 302 that may be implemented by the DSP 202. The DSP 202 executes operating system drivers 304 that provide a platform from which the rest of the software operates. The operating system drivers 304 provide drivers for the UE X02 hardware with standardized interfaces that are accessible to application software. The operating system drivers 304 include application management services (AMS) 306 that transfer control between applications running on the UE X02. Also shown in FIG. 3 are a web browser application 308, a media player application 310, and Java applets 312. The web browser application 308 configures the UE. X02 to operate as a web browser, allowing a user to enter information into forms and select links to retrieve and view web pages. The media player application 310 configures the UE X02 to retrieve and play audio or audiovisual media. The Java applets 312 configure the UE X02 to provide games, utilities, and other functionality. A component 314 might provide functionality described herein. The UE X02, a base station X10, and other components described herein might include a processing component that is capable of executing instructions related to the actions described above.

Figure 4:
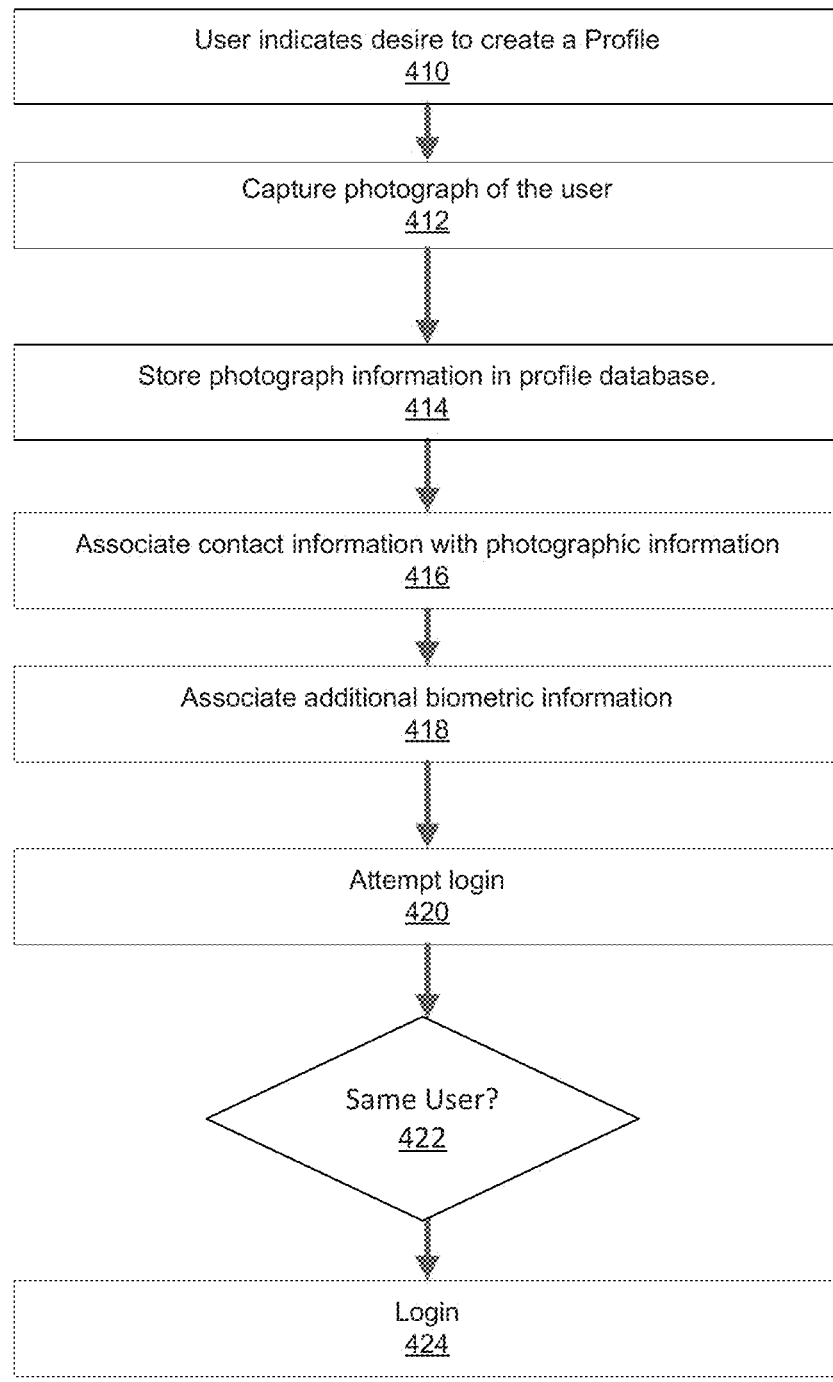
FIG. 4 shows a flow chart of the operation of a facial communication system.

FIG. 4 shows a flow chart of the operation of a social network profile portion of the facial communication system. More specifically, at step 110, a user indicates a desire to create a profile such as a profile within a social network. Next, at step 412, a camera (such as camera 234) captures photographic information of the user who is attempting to create the profile. Next at step 414, the captured photographic information is stored within a database (such as a social network database). Once the photographic information is stored, this photographic information is locked so that it is not easily changed by the user. After the photographic information is stored within the database, the user associates communication information, such as a phone number, email address, IM Chat ID, etc. with the photographic information at step 416. Next, at step 418, additional biometric information may be stored within the database.

After the biometric information is stored within the database, any time the user wishes to login to their social profile such as at step 420, the social network compares the photographic information (or other biometric information) of the person attempting to login to the social network with that information stored within the database. At step 422, the facial communication system determines whether the biometric information of the person attempting to login to the social network corresponds to the information stored within the database. If so, then the social network identifies the person as the same user and allows the user to login at step 424.

Figure 5:
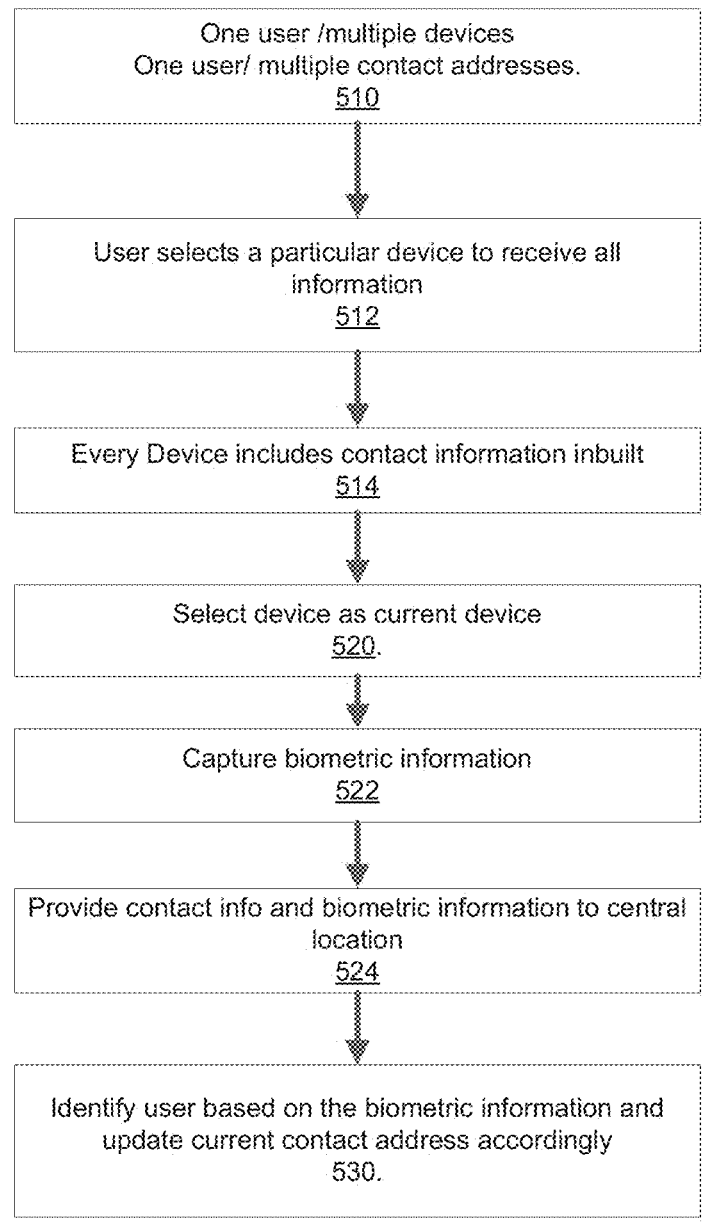
FIG. 5 shows a flow chart of the operation of a dynamic address change system.

Referring to FIG. 5 a flow chart of the operation of a dynamic address change portion of the facial communication system is shown. With the dynamic address change portion of the facial communication system, a user can change current contact information (Mobile Number, Email address, IM Chat ID etc) dynamically based on a device change. This changed contact information can also be updated in within a social networking site database. In certain embodiments, biometric information of the user is used to change the communication address in social networking site.

A plurality of different devices may be used to dynamically change the contact information. The devices have a means for recognizing an individual user. For example, mobile communication devices may include a fingerprint reader or camera, computer devices may include a fingerprint reader or camera, mass media devices (such as for example, a television may include a camera). Additionally, it is desirable that these devices include a direct two way connectivity with social networking site.

More specifically, in operation, as indicated by step 510, a user may have multiple devices such as a mobile communication device, a computer device and amass media device. Additionally, as also indicated by step 510, the user may have multiple communication addresses. With such a condition, a user may select a particular device to have all information within a particular device as indicated by step 512. With the facial communication system all devices of a user include inbuilt contact information at step 514.

Next, at step 520, the users selects a particular device and indicates that this device is the user's current device. By indicating that the device is the current device the user defines that the particular device is being used at that particular time.

Next, at step 522, when a device is selected as a current device, the device captures biometric information for the user. This biometric information may be a photograph of the user that is captured via a camera that is coupled to or installed on the device. The biometric information may also be a fingerprint that is obtained via a print reading mechanism coupled to or installed on the device.

Next, at step 524, contact information of the user along with the captured biometric information is provided to a central access location such as a social networking server. Next, at step 530 the current communication address of the user is updated within the social networking site based upon the updated contact information and the biometric information so that anyone who wishes to contact the user and has access to the updated information is provided with a quick and easy method for reaching the current device of the user who has updated this information within the social networking server.

Figure 6:
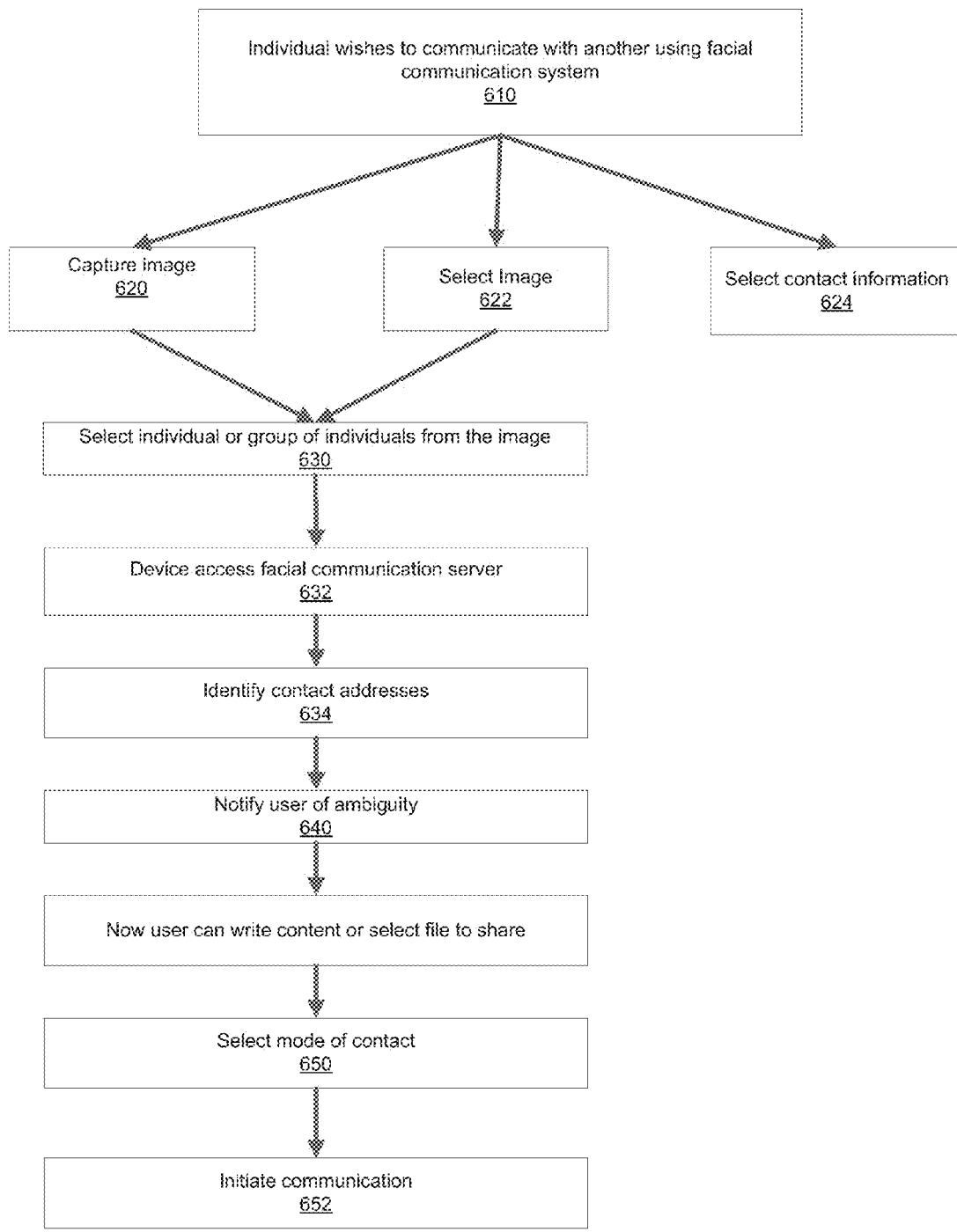
FIG. 6 shows a flow chart of the operation of a contact portion of a facial communication system.

Referring to FIG. 6, a flowchart of the operation of a contact portion of the facial communication system is shown. In operation, as indicated by step 610, the contact portion of the facial communication system is accessed when an individual person wishes to communicate with another individual or group of individuals, e.g., via phone call, SMS, MMS or email communication.

More specifically, in one instance, the individual captures an image (e.g., a photograph) of the other individual with whom communication is desired at step 620. Alternately, in another instance, the individual selects a stored image of an individual or a group image of the group of individuals with whom communication is desired at step 622. Alternately, in another instance, the individual selects a stored contact information of the individual or group of individuals with whom communication is desired at step 624.

When the individual captures an image (step 620) or selects an image (step 622), then the user selects an individual or a group of individuals from the image with whom communication is desired at step 630. Next, at step 632, the device on which the image information is stored accesses a server on which facial information and contact information is stored. In certain embodiments the access may be via the Internet. Also in certain embodiments, the server may be a social network server, Next at step 634, the server identifies communication addresses of the selected individual or group of individuals based upon the facial information and provides this information to the device making the request. In certain embodiments the communication addresses correspond to address identified by the user corresponding to the facial information as their current address. Also in certain embodiments, security is enabled on the server to determine whether the individual requesting the information is authorized to have access to the contact information, For example, in certain embodiments, the contact information may only be available to friends or a subset of friends identified in the social network.

Next, at step 640, if there is an ambiguity in the identification of the facial information (or other biometric information), the user who captured the image is notified of the ambiguity. An ambiguity may occur when more than one contact is identified as a potential match for the biometric information (e.g., multiple contacts look alike). Next, at step 642, the user writes content or selects a file to share. If there is an ambiguity, then the system displays other related shared information of every potentially identified person. For example, a user's profile (e.g., nick name, occupation, schools date of birth, etc.), friend circles, recent posts, etc. are used to either write content or select a file to share. Based upon this information the user can identify the correct person from the facial information.

Upon receiving the communication address, the user then selects a mode of contacting the identified individual at step 650. This mode may be based upon what type of communication address is provided by the server. E.g., if the communication address is an email address then the mode of contacting the identified individual would likely be via email. If the communication address is a telephone number the mode of contacting the identified individual would likely be via a telephone call. If the communication address is a mobile device, then the mode of contacting the individual may either be via text message or via a telephone call. Next, the communication is initiated by the device based upon the selected mode of contact at step 652.

Figure 7:
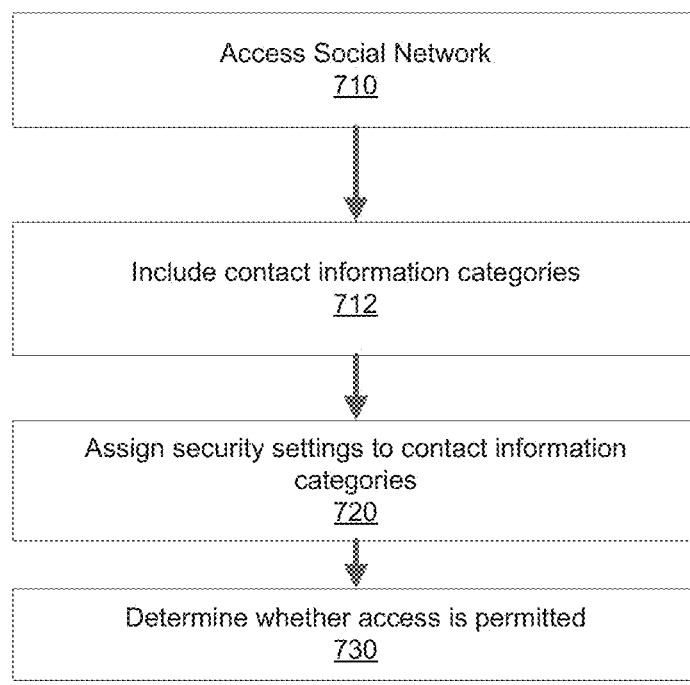
FIG. 7 shows a flow chart of the operation of a profile portion of a facial communication system.

Referring to FIG. 7, a flowchart of the operation of a profile portion of the facial communication system is shown. More specifically, a user accesses their profile within a social network at step 710. The profile is configured to include one or more contact information categories at step 712. For example, the contact information categories can include personal contact information, business contact information, etc. The contact information categories are then assigned respective security levels at step 720 by the user. The different contact information categories may have different security levels. The different security levels define who can access the contact information. Additionally the security levels can define which, if any, contact information, may be accessed based upon facial (or other biometric) information.

When a user accesses the social network, the security settings determine whether access to the contact information is permitted at step 730. In the case where an individual does not meet the defined security criteria, upon selecting any face from an image, the unauthorized person cannot access the contact information necessary call or send email. Also, in certain embodiments, the sec level may allow certain contact information to be accessed (e.g., email information) which precluding access to other contact information (e.g., telephone number). Also, in certain embodiments, a mobile device having the facial communication functionality also includes the user contact information. In these embodiments, when initiating a call based upon face selection, an identifier of the mobile device is validated based upon the biometric information stored within the social networking security setting for the selected face. If the person is authorized then only the person complete the initiated communication.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, cattier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices card, stick). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A system comprising:
a processor;
a data bus coupled to the processor; and
a computer-usable medium embodying computer program code, the computer-usable medium being coupled to the data bus, the computer program code comprising instructions executable by the processor and configured for:
generating biometric information of a user;
associating the biometric information of the user with contact information of the user, the contact information of the user comprising at least one communication address of the user, the contact information of the user being stored within a central access location; and,
using the biometric information to access the contact information of the user from the central access location; and wherein
the central access location comprises a Social Network; and
the computer executable instructions are further configured for
storing the biometric information of the user and the contact information of the user within the Social Network; and,
allowing access to the contact information of the user within the Social Network via the biometric information.

2. The system of claim 1 wherein the computer executable instructions are further configured for
identifying at least one communication device of a user as a current communication device;
dynamically updating the communication address of the user to correspond to the current communication device of the user.

3. The system of claim 1 wherein the computer executable instructions are further configured for
providing security setting to limit access to the current communication address to certain desired other users.

4. The system of claim 1 wherein the computer executable instructions are further configured for
performing a facial recognition operation using the biometric information; and,
associating the biometric information with the communication address based upon the facial recognition operation.

5. A non-transitory computer-usable medium embodying computer program code, the computer program code comprising computer executable instructions configured for:
generating biometric information of a user;
associating the biometric information of the user with contact information of the user, the contact information of the user comprising at least one communication address of the user, the contact information of the user being stored within a central access location; and,
using the biometric information to access the contact information of the user from the central access location; and wherein
the central access location comprises a Social Network; and
the computer executable instructions are further configured for
storing the biometric information of the user and the contact information of the user within the Social Network; and,
allowing access to the contact information of the user within the Social Network via the biometric information.

6. The computer-usable medium of claim 5 wherein the computer executable instructions are further configured for
identifying at least one communication device of a user as a current communication device;
dynamically updating the communication address of the user to correspond to the current communication device of the user.

7. The computer-usable medium of claim 5 wherein the computer executable instructions are further configured for providing security setting to limit access to the current communication address to certain desired other users.

8. The computer-usable medium of claim 5 wherein the computer executable instructions are further configured for
performing a facial recognition operation using the biometric information; and,
associating the biometric information with the communication address based upon the facial recognition operation.

* * * * *